United States Patent [19]

Sonoda et al.

[11] Patent Number: 4,663,141

[45] Date of Patent: May 5, 1987

[54] PROCESS FOR RECOVERING OR PURIFYING SELENIUM

[75] Inventors: Noboru Sonoda; Naoyuki Hosoda; Kazumasa Hori, all of Osaka, Japan

[73] Assignee: Mitsubishi Kinzoku Kabushiki Kaisha, Japan

[21] Appl. No.: 764,878

[22] Filed: Aug. 12, 1985

[30] Foreign Application Priority Data

Aug. 15, 1984 [JP] Japan .................. 59-169408

[51] Int. Cl.$^4$ ............................................. C01B 19/02
[52] U.S. Cl. ..................................... 423/510; 423/508
[58] Field of Search ................................. 423/510, 508

[56] References Cited

U.S. PATENT DOCUMENTS 4,374,250  2/1983  Hirashima et al. ............... 548/305

FOREIGN PATENT DOCUMENTS 46-11492 of 1971 Japan.
51-9734 of 1976 Japan.

OTHER PUBLICATIONS

Sonoda, N. et al., J. Am. Chem. Soc., 93, 6344 (1971).
Kiyoshi Kondo et al., "New Route for the Synthesis of Tetraalkylureas" Chem. Lett. (5) pp. 402-404 (1972).

Primary Examiner—John Doll
Assistant Examiner—Jackson Leeds
Attorney, Agent, or Firm—Webb, Burden, Robinson & Webb

[57] ABSTRACT

A process for recovering or purifying selenium is disclosed. A selenium-containing material is reacted with carbon monoxide and ammonia or a primary or secondary amine to form a compound soluble in an aprotic solvent. The reaction product is subjected to the reverse reaction by heating it to liberate selenium, which is separated by filtration. The reaction is specific to selenium, and selenium can be separated from sulfur, tellurium, arsenic, halogen, etc. The used reagents can be recovered and used repeatedly.

7 Claims, No Drawings

PROCESS FOR RECOVERING OR PURIFYING SELENIUM

FIELD OF THE INVENTION

This invention relates to a process for selectively separating and recovering selenium from sludge, scrap, mixtures or alloys containing selenium.

Selenium-tellurium alloys, selenium-arsenic alloys, etc. are widely used in photosensitive elements for electrophotographic copying machines. Such a photosensitive element generally comprises a drum of aluminum on the surface of which a selenium-tellurium alloy or a selenium-arsenic alloy is vacuum-deposited. In this vacuum deposition, the utilization factor of selenium-containing alloy is very low, since a large amount of selenium-containing alloy deposits on the surface of the vacuum deposition chamber and becomes scrap. Also, piles of selenium-containing alloy scrap, such as those from used photosensitive drums, those from rejected products, etc. are being accumulated at factories of copying machine manufacturers, selenium smelters, etc. Thus recovery and recycled use of selenium from these materials is an important problem. This invention is primarily aimed at recovery of selenium from the above-mentioned selenium-containing materials, but it is not limited thereto.

BACKGROUND OF THE INVENTION

The most common process of preparing or recovering selenium comprises converting selenium in a selenium-containing material to selenium dioxide ($SeO_2$) by oxidizing roast or sulfatizing roast in a roasting furnace, dissolving the selenium dioxide in an aqueous solution, purifying said solution and reducing the dissolved selenium dioxide with sulfur dioxide ($SO_2$) to obtain selenium of 99.9% purity. This process is widely employed because of the advantage that materials in any form can be treated. However, a large scale facility including a roasting furnace, apparatuses for selenium dioxide collection, treatment of waste gases, etc. is required, and the energy consumption is large and the cost for reduction of sulfur dioxide is very high.

Various wet processes for recovering selenium are proposed in Japanese Laid-Open Patent Publication No. 128595/80 and other publications. However, those process are limited as regards kinds of materials, condition in which selenium is present, applicability of used reagents, etc., and in most cases waste liquid treatment is required. Therefore, those processes are not so widely employed as the above-described process. In Japanese Patent Publication No. 35006/84, there is disclosed a wet process, in which a strong acid such as nitric acid, hydrochloric acid, etc. are used. In this process, however, equipment maintenance is not easy because the strong acid is used, and measures for treatment of $NO_x$, which is generated during the operation, are required. Further, as hydrazine is used as a reducing reagent, this is not an economical process.

Japanese Patent Publication No. 9734/76 discloses a process for preparing tetrasubstituted urea, in which a primary or secondary amine is reacted with carbon monoxide and selenium to form a tetrasubstituted urea. The reaction proceeds, for instance, as follows:

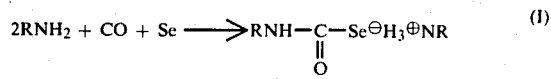

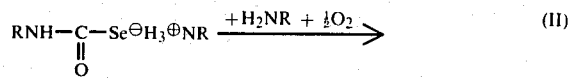

$$RNH-C(=O)-NHR + H_2NR + H_2O$$

In the case of a secondary amine,

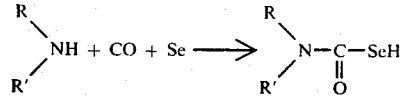

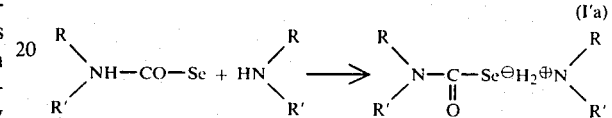

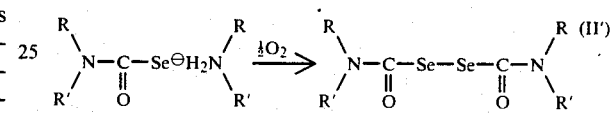

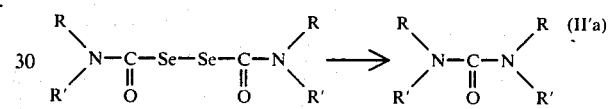

The intermediate product of the reaction (I) and the product of the reactions (I') and (I'a) are soluble in the reaction system. Needless to say, R and R' in the above chemical formulas each stands for a hydrocarbyl group.

We noted that the above reactions are reversible and we inferred that this reaction could be utilized for recovery and purification of selenium, and we completed the present invention. For the purpose of this invention, only the first step reactions (I) or (I') and (I'a) are necessary.

DISCLOSURE OF THE INVENTION

This invention provides a process for recovering or purifying selenium comprising reacting a selenium-containing material with carbon monoxide and ammonia or primary or secondary amine in an aprotic solvent to convert the selenium to a compound soluble in said solvent, separating solid residues, and heating the selenium-containing solution to precipitate selenium.

In the present invention, it should be understood the term "aprotic solvent" encompasses an excess amount of the used amine, as will be explained later.

In the process of this invention, dissolution of selenium occurs in the temperature range of $-50°$ C. to $100°$ C. and it proceeds advantageously at room temperature. But carbon monoxide is used and therefore an autoclave is used, and the reaction can be accelerated by pressurizing the reaction system to 10–30 kg/cm².

Amine compounds which can be used in the present invention, include primary and secondary aliphatic amines, alicyclic amines, heterocyclic amines, aromatic amines, alkanolamines, etc. Those suitable from the viewpoint of easiness of purification, removal from the reaction system by distillation, etc., are dimethylamine, diethylamine, di-n-propylamine, di-n-butylamine, piperidine, pyrrolidine, diisopropylamine, ethanolamine, diethanol amine, etc.

In the process of this invention, some amines themselves act as the solvent. But use of a separate solvent is preferred for the purpose of controlling the reaction conditions. The solvent can be selected from aprotic solvents which are inert to the reaction and dissolve the used amine. Preferred solvents are tetrahydrofuran (THF), dimethylformamide (DMF), pyridine, triethylamine, acetonitrile, benzene, toluene, cyclohexane, etc.

The reaction with carbon monoxide occurs in the range of $-50°$ C. to $100°$ C., and proceeds at normal temperature under normal pressure. But the reaction is sufficiently and advantageously accelerated at room temperature by pressurizing the reaction system in an autoclave to $10-30$ kg/cm$^2$. It is known that if a tertiary amine such as triethylamine is added to the reaction system, the reaction may be accelerated, although the reason therefor is not known.

This reaction is specific to selenium, and coexisting substances other than selenium are not involved. Therefore this process is particularly effective in cases where impurities such as sulfur, tellurium, arsenic, halogens, etc., which are usually not easily separable from selenium, coexist with the selenium to be recovered. Even if impurities which are soluble in organic solvents coexist, selenium can be recovered at remarkably high purity, because only selenium is precipitated in the reverse reaction in the later step. Therefore, it will be understood that this process not only can be used for recovery of selenium from scrap but is also effective as a method of purification of selenium.

According to the process of this invention, selenium of a high purity not lower than 99.999% can be recovered at a yield of 98% or higher, and the recovered products can be used not only for the production of glass and pigments but also for electrophotographic elements.

Used ammonia, amines, carbon monoxide and solvent can be recovered and used repeatedly.

The process of this invention has the following advantages:

(1) Almost 100% of the used ammonia or amines, and solvents, if used, can be recovered and reused.

(2) Most of the carbon monoxide used can be recovered and reused.

(3) The reaction proceeds satisfactorily at a temperature not lower than $0°$ C.

(4) The thermal decomposition temperature depends on the amine and solvent used, but is usually not higher than $100°$ C. and never higher than $200°$ C. at the highest, so that energy costs are low.

(5) The reaction is specific to selenium selectively and does not involve other coexisting substances. Sulfur, tellurium, arsenic and halogens can be separated from selenium.

(6) The reaction rate can be easily increased under control by pressurization and heating of the reaction system.

DESCRIPTION OF EMBODIMENTS OF THE INVENTION

EXAMPLE 1

Ten (10) grams of a selenium scrap from a vacuum deposition process consisting essentially of a selenium-tellurium (9%) alloy, 20 ml of diethylamine and 50 ml of THF were charged into an autoclave having a nominal volume of 500 ml. After the autoclave was closed, carbon monoxide gas was introduced into the autoclave under pressure up to 5 kg/cm$^2$, and the system was allowed to react under agitation at room temperature. After the reaction was finished, the carbon monoxide was recovered into a rubber balloon through the gas outlet of the autoclave, and the remaining carbon monoxide was further recovered by draining using a nitrogen gas stream. The resulting non-gaseous reaction mixture was collected and filtered. The filtrate was heated in a distiller equipped with a refluxing cooler, and the evolved residual carbon monoxide gas was collected. At around $70°$ C., the reaction product was decomposed and selenium was precipitated. The selenium was collected by filtration and the remaining diethylamine and THF were recovered.

The purity of the recovered selenium was not lower than 99.999%, and the recovery yield was 99%. Gas chromatographic analysis revealed that the recovery yields of the amine, THF and carbon monoxide were not lower than 99%.

EXAMPLE 2

Ten (10) grams of the same selenium-tellurium scrap as used in Example 1 was charged into the same autoclave together with the whole amount of the diethylamine and THF recovered in Example 1. A portion of the recovered carbon monoxide was introduced into the autoclave under a pressure of 2 kg/cm$^2$. Agitation was continued for 6 hours at room temperature. The reaction mixture was treated in the same manner as in Example 1 and selenium was recovered.

The purity of the recovered selenium was not lower than 99.999% and the recovery yield was 97%. The recovery yields of the amine, THF and carbon monoxide gas were 99% or more.

EXAMPLE 3

Ten (10) grams of the same selenium-tellurium scrap as used in Example 1 was charged into the same autoclave together with 50 ml of THF, and ammonia gas was introduced into the autoclave under a pressure of 6 kg/cm$^2$, and then carbon monoxide gas was introduced into the autoclave under a pressure of 50 kg/cm$^2$. After the reaction system had been agitated at room temperature for 1 hour, it was treated in the same manner as in Example 1 and selenium was recovered. Ammonia was recovered together with carbon monoxide, and the thermal decomposition occurred at around $60°$ C.

The purity of the recovered selenium was not lower than 99.999%, and the recovery yield was 99%. The recovery yields of ammonia, THF and carbon monoxide gas were 98%, 99% and 99% respectively.

EXAMPLE 4

Ten (10) grams of a scrap from a vacuum deposition process consisting essentially of selenium-tellurium (20%), 50 ml of di-n-propylamine and 50 ml of benzene were charged into the same autoclave, and carbon monoxide gas was introduced into the autoclave under a pressure of 10 kg/cm$^2$ and the reaction system was agitated at room temperature for 3 hours. Thereafter, the system was treated in the same manner as in Example 1 and selenium was recovered. The thermal decomposition of the reaction product occurred at around $80°$ C.

The purity of the recovered selenium was not lower than 99.999% and the recovery yield was 96%. The recovery yields of di-n-propylamine, benzene and carbon monoxide gas were all not lower than 99%.

EXAMPLE 5

Ten (10) grams of scrap peeled off from the photosensitive drum of an electrophotographic copying machine and consisting essentially of selenium-arsenic (10%), 20 ml of diethylamine, 20 ml of trithylamine and 50 ml of THF were charged into the same autoclave and then carbon monoxide gas was introduced into the autoclave under a pressure of 40 kg/cm$^2$. The reaction system was agitated at 50° C. for 3 hours. Thereafter the reaction system was treated in the same manner as in Example 1 and selenium was recovered.

The purity of the recovered selenium was not lower than 99.999% and the recovery yield was 98%. The recovery yields of amine, THF and carbon monoxide gas were all not lower than 99%.

EXAMPLE 6

Ten (10) grams of selenium-35% tellurium similar to that used in Example 5 except that the arsenic content was different, 30 ml of diisopropylamine, and 60 ml of dioxane were charged into the same autoclave, and carbon monoxide gas was introduced into the autoclave under a pressure of 40 kg/cm$^2$. The reaction system was agitated at 50° C. for 4 hours. Thereafter, the reaction system was treated in the same manner as in Example 1, and selenium was recovered. The thermal decomposition occurred at around 100° C.

The purity of the recovered selenium was not lower than 99.999% and the recovery yield was 98%.

The recovery yields of diisopropylamine, dioxane and carbon monoxide gas were all not lower than 99%.

EXAMPLE 7

Ten (10) grams of selenium scrap consisting essentially of 65% selenium, 20% aluminum, 8% tellurium and 5% iron, which was imported from the United States and presumed to be scrap recovered from discarded photosensitive drums, rectifiers, etc. 20 ml of diethylamine, 50 ml of dimethylformamide were charged, and carbon monoxide gas was introduced into the autoclave under a pressure of 10 kg/cm$^2$. The reaction system was agitated at 50° C. for 4 hours. Thereafter, the reaction system was treated in the same manner as in Example 1, and selenium was recovered. The thermal decomposition occurred at about 100° C.

The purity of the recovered selenium was not lower than 99.999% and the recovery yield was 98%.

The recovery yield of diethylamine, dimethylformamide and carbon monoxide gas were all not lower than 99%.

EXAMPLE 8

Ten (10) grams of selenium scrap consisting essentially of 40% selenium, 30% cadmium and 10% Pb, 40 ml of n-butylamine and 50 ml of pyridine were charged into the same autoclave and carbon monoxide gas was introduced into the autoclave up to a pressure of 20 kg/cm$^2$. The reaction system was agitated at room temperature for 3 hours. Thereafter the reaction system was treated in the same manner as in Example 1 and selenium was recovered. The thermal decomposition occurred at around 110° C.

The purity of the recovered selenium was 99.999% and the recovery yield was 88%. The recovery yields of amine and pyridine were 90% and 99% respectively.

EXAMPLE 9

Ten (10) grams of a selenium scrap consisting essentially of 70% selenium, 20% tellurium, 3% arsenic and 2% aluminum, 30 ml of ethanolamine and 50 ml of dimethylformamide were charged in the same autoclave, whereafter carbon monoxide was introduced into the same autoclave under a pressure of 30 kg/cm$^2$. The reaction system was agitated at room temperature for 3 hours for reaction. After the reaction was finished, the reaction system was treated in the same manner as in Example 1 and carbon monoxide was recovered. The non-gaseous reaction mixture was filtered, and the filtrate was heated in a distiller to expel the remaining carbon monoxide. At around 110° C., the thermal decomposition of the reaction product occurred and selenium was precipitated.

The purity of the recovered selenium was not lower than 99.999%, and the recovery yield was 90%. The recovery yields of ethanolamine and dimethylformamide were not lower than 99%.

What we claim is:

1. A process for purifying selenium, having utility in the recovery of selenium from a selenium-containing material containing one or more of sulfur, tellurium, arsenic, aluminum, cadmium, lead and the halogens, comprising:

forming a reaction system of a selenium-containing material, ammonia or a primary or secondary amine, and an aprotic solvent;

introducing carbon monoxide into the system under a pressure of between about 2–50 kg/cm$^2$ and agitating the system at about room temperature for about 1 to 6 hours, selectively to yield as the only reaction product thereof selenocarbamic acid amine salt in solution with said aprotic solvent;

recovering the carbon monoxide from the system;

filtering the resulting mixture from the system and heating the filtrate in a distiller equipped with a refluxing cooler;

collecting the residual carbon monoxide evolved in heating the filtrate for reuse;

filtering the selenium that precipitates out of the filtrate; and recovering ammonia, or the primary or secondary amine, and the aprotic solvent for use.

2. A process for recovering selenium, as set forth in claim 1, wherein carbon monoxide is introduced into the system under a pressure of between about 10–30 kg/cm$^2$.

3. A process for recovering selenium, as set forth in claim 1, wherein the selenium recovered is not lower than 99.999% pure.

4. A process for recovering selenium, as set forth in claim 1, wherein the yield of carbon monoxide, ammonia or the primary or secondary amine and the aprotic solvent recovered for reuse is not lower than 98%.

5. A process for recovering selenium, as set forth in claim 1, wherein the filtrate is heated to a decomposition temperature of between about 60° and 110° C.

6. A process for recovering selenium, as set forth in claim 1, wherein the primary or secondary amine is selected from the group consisting of dimethylamine, diethylamine, di-n-propylamine, di-n-butylamine, piperidine, pyrrolidine, diisopropylamine, ethanolamine, and diethanolamine.

7. A process for recovering selenium, as set forth in claim 1, wherein the aprotic solvent is selected from the group consisting of tetrahydrofuran, dimethylformamide, pyridine, triethylamine, acetonitrile, benzene, toluene, cyclohexane and dioxane.

* * * * *